US012792321B2

(12) United States Patent
Huang

(10) Patent No.: US 12,792,321 B2
(45) Date of Patent: Nov. 10, 2026

(54) DYNAMIC USER INTERFACE GENERATION USING LARGE LANGUAGE MODELS

(71) Applicant: Airbnb, Inc., San Francisco, CA (US)

(72) Inventor: Joseph Jyh-Huei Huang, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 229 days.

(21) Appl. No.: 18/891,390

(22) Filed: Sep. 20, 2024

(65) Prior Publication Data

US 2025/0094143 A1 Mar. 20, 2025

Related U.S. Application Data

(60) Provisional application No. 63/539,407, filed on Sep. 20, 2023.

(51) Int. Cl.
*G06F 8/38* (2018.01)

(52) U.S. Cl.
CPC .................................... *G06F 8/38* (2013.01)

(58) Field of Classification Search
None
See application file for complete search history.

(56) References Cited

U.S. PATENT DOCUMENTS

| | | | | |
|---|---|---|---|---|
| 11,681,505 | B2 * | 6/2023 | Mukherjee | G06F 8/60 717/107 |
| 2019/0317739 | A1 * | 10/2019 | Turek | G06F 40/00 |
| 2020/0380415 | A1 * | 12/2020 | Siracusa | G06N 3/08 |
| 2022/0382527 | A1 | 12/2022 | Wang et al. | |
| 2025/0021309 | A1 * | 1/2025 | Schmidt | G06F 8/34 |
| 2025/0156122 | A1 * | 5/2025 | Yu | G06N 7/01 |

OTHER PUBLICATIONS

Zhao, "GUIGAN: Learning to Generate GUI Designs Using Generative Adversarial Networks", 2021, IEEE (Year: 2021).*
Baule, "Recent Progress in Automated Code Generation from GUI Images Using Machine Learning Techniques", 2020, Journal of Universal Computer Science, vol. 26, No. 9 (2020), (Year: 2020).*
US/RO, International Search Report and Written Opinion mailed on Dec. 2, 2024, for related International Application No. PCT/US2024/047643, 10 pgs.

* cited by examiner

*Primary Examiner* — Hossain M Morshed
(74) *Attorney, Agent, or Firm* — McDermott Will & Schulte LLP

(57) ABSTRACT

An embodiment includes training a first large language model (LLM) to generate source code implementing an input set of user interface (UI) components, the training resulting in a trained UI generation model. An embodiment includes generating, from a first decision query, a first UI generation task, the first UI generation task comprising a decision criterion and a dataset. An embodiment includes generating, from the first UI generation task, using the trained UI generation model, first source code implementing a first arrangement of UI components. An embodiment includes executing, using a webpage rendering framework, the first source code, the executing rendering the first arrangement of UI components onto a webpage.

20 Claims, 7 Drawing Sheets

DYNAMIC USER INTERFACE GENERATION USING LARGE LANGUAGE MODELS

CROSS-REFERENCE OF RELATED APPLICATION

This application claims the benefit of U.S. Provisional Application No. 63/539,407, filed on Sep. 20, 2023, which is incorporated herein in its entirety.

TECHNICAL FIELD

The present disclosure generally relates to user interface generation, and more particularly to dynamic user interface generation using large language models.

BACKGROUND

A large language model (LLM) is a computational model capable of language generation or other language processing tasks, including natural language query processing. LLMs acquire these abilities by learning statistical relationships from training text during a training process. Some LLMs are trained to output natural language text, for example in English. Other LLMs are trained to output computer source code. In some LLM implementations, a foundational LLM is a general-purpose model which can be fine-tuned (generated a fine-tuned model) to a more specific task. For example, a general-purpose natural language generation model, with general knowledge of a range of subject matter, might be fine-tuned with data pertinent to a particular subject matter (e.g., sports, financial data, or a particular science) to generate natural language text in that particular subject. An input to an LLM is also referred to as a prompt.

Graphical user interfaces (GUIs), or simply user interfaces (UIs) in software applications provide a richer and sometimes more efficient way for a user to interact with a computer compared to text alone. However, GUIs are typically designed and implemented in a static way for users to interact with, with a predetermined layout and options that guide a user through a task flow. If the user needs to complete a task that the GUI was not designed to accommodate, the user must find another application to use. Thus, there is a need to generate a GUI dynamically, in response to a user's particular need or task.

SUMMARY

Some embodiments of the present disclosure provide a computer-implemented method for dynamic user interface generation using large language models. The method includes training a first large language model (LLM) to generate source code implementing an input set of user interface (UI) components, the training resulting in a trained UI generation model; generating, from a first decision query, a first UI generation task, the first UI generation task comprising a decision criterion and a dataset; generating, from the first UI generation task, using the trained UI generation model, first source code implementing a first arrangement of UI components; and executing, using a webpage rendering framework, the first source code, the executing rendering the first arrangement of UI components onto a webpage.

Some embodiments of the present disclosure provide a non-transitory computer-readable medium storing a program for dynamic user interface generation using large language models. The program, when executed by a computer, configures the computer to train a first large language model (LLM) to generate source code implementing an input set of user interface (UI) components, the training resulting in a trained UI generation model; generate, from a first decision query, a first UI generation task, the first UI generation task comprising a decision criterion and a dataset; generate, from the first UI generation task, using the trained UI generation model, first source code implementing a first arrangement of UI components; and execute, using a webpage rendering framework, the first source code, the executing rendering the first arrangement of UI components onto a webpage.

Some embodiments of the present disclosure provide a system for dynamic user interface generation using large language models. The system comprises a processor and a non-transitory computer readable medium storing a set of instructions, which when executed by the processor, configure the processor to train a first large language model (LLM) to generate source code implementing an input set of user interface (UI) components, the training resulting in a trained UI generation model; generate, from a first decision query, a first UI generation task, the first UI generation task comprising a decision criterion and a dataset; generate, from the first UI generation task, using the trained UI generation model, first source code implementing a first arrangement of UI components; and execute, using a webpage rendering framework, the first source code, the executing rendering the first arrangement of UI components onto a webpage . . .

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

Figure 1:
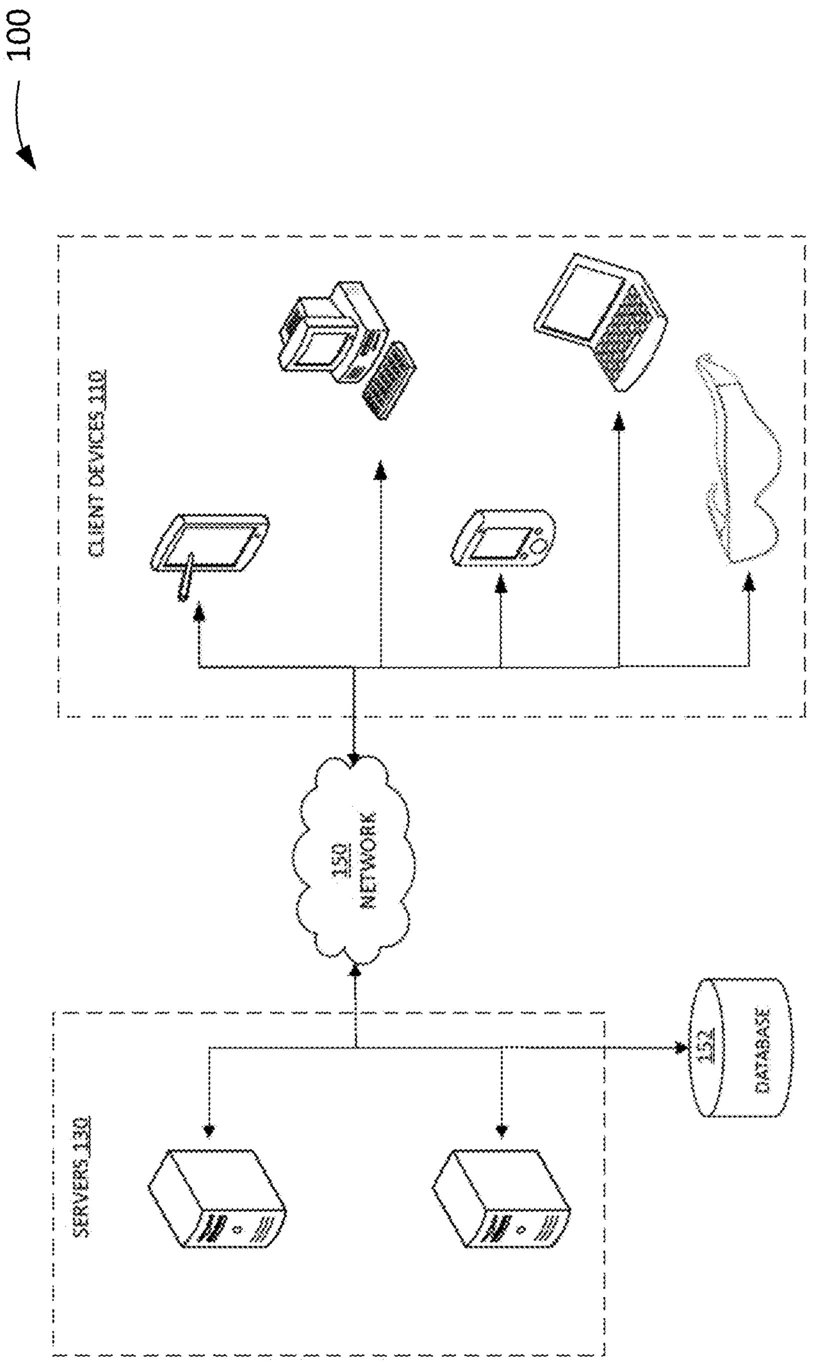
FIG. 1 illustrates a network architecture used to implement dynamic user interface generation using large language models, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Embodiments of the present disclosure address the above identified problems by implementing dynamic user interface generation using large language models. In particular, an embodiment trains a first LLM to generate source code implementing an input set of UI components; generates, from a first decision query, a first UI generation task, the first UI generation task comprising a decision criterion and a dataset; generates, from the first UI generation task, using the trained UI generation model, first source code implementing a first arrangement of UI components; and executes, using a webpage rendering framework, the first source code, the executing rendering the first arrangement of UI components onto a webpage.

One embodiment includes three levels of UI component organization:

1) UI component library: a set of UI components such as buttons, input fields, sliders, etc. These are the primitives of our system.
2) Block library: Blocks are self-contained GUI units composed of UI components which enable user interaction. They are like mini applications that can be embedded in the body of a document, page, or form. Blocks can be linked together to pass data between each other.
3) Shape library: Shapes are a set of blocks linked together that enable the user to complete a task flow. The shape library is a set of shapes that solve different problems or tasks.

In one embodiment, starting with a base set of human defined UI components, the first LLM is trained to understand each UI component and its functionality. Given the set of UI components, the LLM is then asked to generate blocks (by combining UI components together) that solve a narrow problem or task and save them in a block library. Along with the top-level request, constraints can be provided that help the system select the best options to achieve the desired goals. For instance, different block layouts would be generated according to the space that is available on a given device, with more compact components being selected if space constraints are given priority. Another type of request parameter would provide guidance about how consistent the interface should be with respect to a previous user interface layout that a person might have interacted with previously. Often, it is preferable to maintain the position and look of a set of components that the user has interacted with previously over changing the experience to a more optimal, but perhaps less expected, layout.

Large language models are used not only to select the type of component used to represent the underlying input and output data, and their properties (e.g. width, height), but also the order of the sub-components relative to each other. Consider an address block, it would be counterproductive to arrange the sub-fields (e.g. street address, city, state) in any order other than the user expects it to be, based on their previous experience. Large language models are particularly suited to determining the appropriate "common sense" order and groupings for arranging components into blocks, particularly because of their ability to capture the implicit conceptual norms learned from massive amounts of text and web-based interfaces that they have consumed during their training.

Given a library of blocks, the LLM is then asked to generate shapes (by combining blocks together) that solve a broader problem or task and save them in a shape library. The LLM may be asked to generate new UI components as well, when the existing library is insufficient to solve problems/tasks, thus infinitely expanding the base UI component library as needed (when new problems are encountered).

Users may give us a prompt (decision problem) and we can generate a GUI dynamically to help solve problems in a rich and interactive way. This may look like interactive graphs, diagrams, videos, images, sliders, buttons, maps, etc. Since the system is generating GUI dynamically, it is not constrained by what it may have been designed to solve. Thus, it can handle a broader range of decision problems, including problems that the designer/engineer had never anticipated nor designed/built for. It can also be adaptive to the user requests in a way that traditional, hard-coded interfaces are not. For example, if someone asks "what's the best car to buy that has good mileage", it would be ideal to list the MPG on the summary for each car presented by the interface, not because it had been placed there explicitly by a user interface designer but rather because this is a salient element of the user's request.

An embodiment trains a first LLM to generate source code implementing an input set of UI components. In some embodiments, the training includes fine-tuning a foundational source code generation LLM using a dataset of user interface component data as training data. One non-limiting example of a foundational source code generation LLM is CodeLlama; other LLMs that generate source code, both open source and not, are also available and contemplated within the scope of the illustrative embodiments. (Llama is a registered trademark of Meta Platforms, Inc. in the United States and other countries. Note that CodeLlama is itself created from the general-purpose Llama 2 LLM that was created by further training Llama 2 on code-specific datasets. Code Llama can generate code, and natural language about code, from both code and natural language prompts.) Some non-limiting examples of datasets of user interface component data usable as training data during the fine-tuning are developer documentation from open-source UI component libraries such as Chakra UI or Bootstrap. These datasets of user interface component data include a documentation page for every UI component in a library. Each page explains what the component is called, what the component is used for, and includes code-snippets for rendering or using the component. To fine-tune a foundational source code generation LLM using a dataset of user interface component data as training data, one embodiment uses Parameter-Efficient Fine-Tuning (PEFT) with Low-Rank Adaptation (LoRA), both presently available techniques. Other fine-tuning techniques are also possible and contemplated within the scope of the illustrative embodiments. Once an LLM is trained to generate source code implementing an input set of UI components, for example by fine-tuning, the LLM is capable of responding to a prompt such as "I am a user that needs to submit my shipping info including my name, address, and email address to the system as part of a checkout flow. Write code that enables me to do so using UI components," with source code that implements an arrangement of UI components, such as a shipping information form the user can fill out to provide shipping information.

An embodiment receives a first decision query from a user. A decision query is a request for a UI to help the user explore data relevant to making a decision. One non-limiting example of a decision query is "help me decide which electric car to buy."

An embodiment generates a first UI generation task from the first decision query. The first UI generation task includes a decision criterion and a dataset of data relevant to the decision criterion. To generate the first UI generation task, an embodiment generates a prompt corresponding to the first decision query and supplies the generated prompt to a second LLM. In one embodiment, the second LLM is a foundational language generation LLM trained to produce text. Foundational language generation LLMs trained to produce text are presently available. For example, if the decision query is "help me decide which electric car to buy," an embodiment might generate a prompt such as "You are an assistant that helps users reason about a decision problem. Decide what criteria is most common for the decision and what data should be considered. Here is an input example: What electric car should I buy? Here is an output example: [Table of criteria to consider] [Table of data to select from]." Some non-limiting examples of decision criteria corresponding to the electric car decision, that might be output by the foundational language generation LLM trained to produce text, are range, horsepower, price, tax incentives, and charging infrastructure. Some non-limiting examples of data to select from corresponding to the electric car decision, that might be output by the foundational language generation LLM trained to produce text, are top ten best-selling electric vehicle makes and models and the most important attributes for each, such as range, horsepower, price, number of seats, 0-60 time, and number of doors. Note that training text for some foundational language generation LLMs includes some decision-related knowledge up to a particular training date. One embodiment supplements the LLM's knowledge with additional or updated data, for example obtained from a dataset or by searching a communications network such as the internet.

An embodiment uses the trained UI generation model to generate, from the first UI generation task, first source code implementing a first arrangement of UI components. In particular, an embodiment generates a prompt corresponding to the first UI generation task and supplies the generated prompt to the trained UI generation model. The prompt includes the first UI generation task and, optionally, descriptions of previously generated UI components. In response to the prompt, the trained UI generation model generates source code implementing the first UI generation task. If the trained UI generation model does not find one or more appropriate UI components in the descriptions of previously generated UI components, an embodiment generates source code for UI components to be displayed in one or more logical groups as a form. Note that if the overall cached UI component dataset becomes too large for the trained UI generation model's context window (i.e., the size of the mode's prompt), one embodiment uses Retrieval Augmented Generation (RAG), a presently available technique, to search and match the right blocks for use rather than including the entire dataset in the prompt. Other prompt supplementation techniques are also possible and contemplated within the scope of the illustrative embodiments.

An embodiment uses a webpage rendering framework, a presently available technique, to execute the generated source code, rendering the first arrangement of UI components onto a webpage or other UI implementation accessible to a user for use in exploring data relevant to the user's decision query.

An embodiment solicits and obtains feedback from a user regarding the first arrangement of UI components. An embodiment uses the trained UI generation model and the feedback corresponding to the first arrangement of UI components to generate, from the first UI generation task, second source code implementing a second arrangement of UI components. An embodiment uses the webpage rendering framework to execute the generated source code, rendering the second arrangement of UI components onto a webpage or other UI implementation accessible to a user for use in exploring data relevant to the user's decision query. Another embodiment uses the feedback to further train the trained UI generation model, for example using a presently available reinforcement fine-tuning technique.

An embodiment stores, in a UI component dataset, source code implementing a generated UI component in an arrangement of UI components. In embodiments, the UI component dataset includes a description of the generated UI component as well as the source code implementing the generated UI component. From a second decision query (from the same or a different user), an embodiment generates a second UI generation task including a second decision criterion and a second dataset. An embodiment generates, from the second UI generation task, using the trained UI generation model, source code implementing a third arrangement of UI components. The source code includes stored source code from the UI component dataset.

FIG. 1 illustrates a network architecture 100 used to implement dynamic user interface generation using large language models, according to some embodiments. The network architecture 100 may include one or more client devices 110 and servers 130, communicatively coupled via a network 150 with each other and to at least one database 152. Database 152 may store data and files associated with the servers 130 and/or the client devices 110. In some embodiments, client devices 110 collect data, video, images, and the like, for upload to the servers 130 to store in the database 152.

The network 150 may include a wired network (e.g., fiber optics, copper wire, telephone lines, and the like) and/or a wireless network (e.g., a satellite network, a cellular network, a radiofrequency (RF) network, Wi-Fi, Bluetooth, and the like). The network 150 may further include one or more of a local area network (LAN), a wide area network (WAN), the Internet, and the like. Further, the network 150 may include, but is not limited to, any one or more of the following network topologies, including a bus network, a star network, a ring network, a mesh network, and the like.

Client devices 110 may include, but are not limited to, laptop computers, desktop computers, and mobile devices such as smart phones, tablets, televisions, wearable devices, head-mounted devices, display devices, and the like.

In some embodiments, the servers 130 may be a cloud server or a group of cloud servers. In other embodiments, some or all of the servers 130 may not be cloud-based servers (i.e., may be implemented outside of a cloud computing environment, including but not limited to an on-premises environment), or may be partially cloud-based. Some or all of the servers 130 may be part of a cloud computing server, including but not limited to rack-mounted computing devices and panels. Such panels may include but are not limited to processing boards, switchboards, routers, and other network devices. In some embodiments, the servers 130 may include the client devices 110 as well, such that they are peers.

Figure 2:
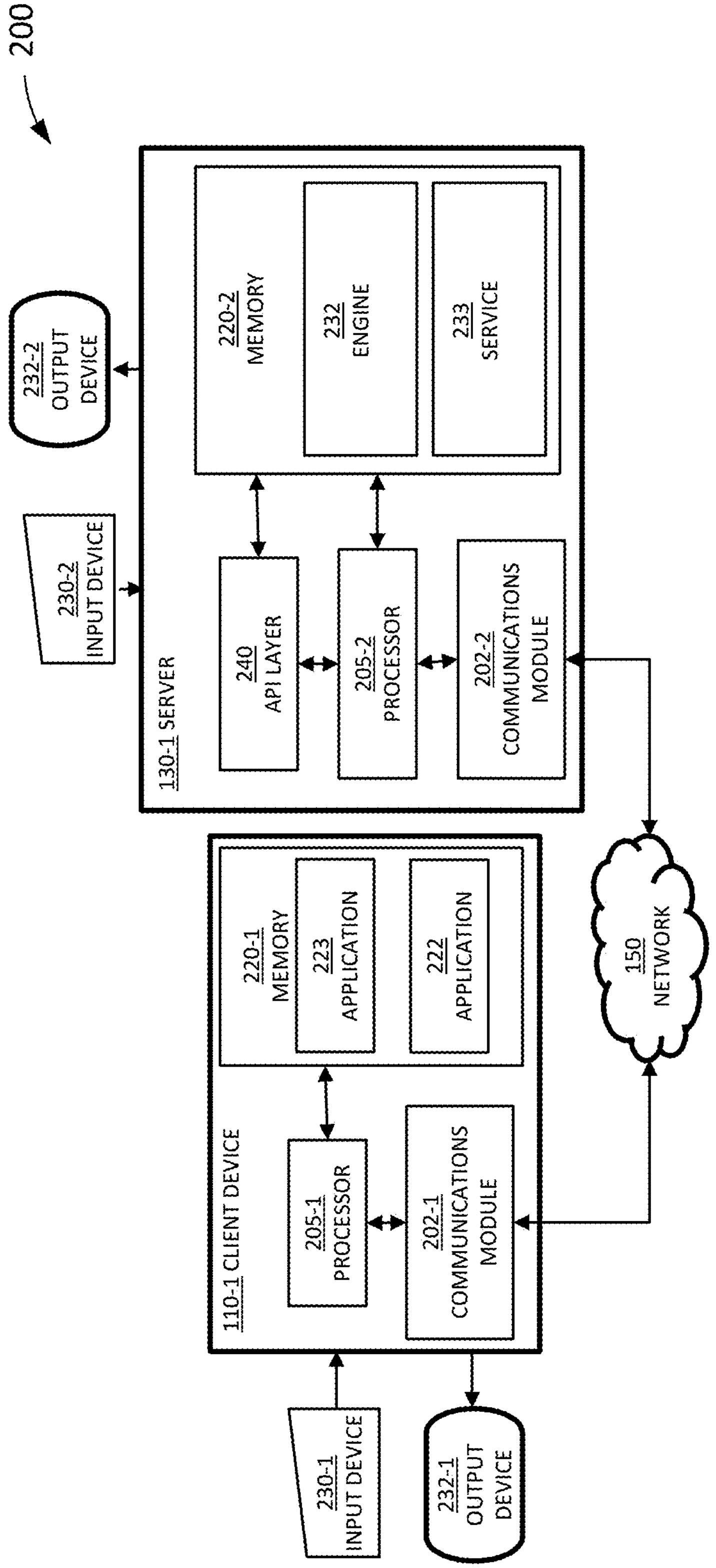
FIG. 2 is a block diagram illustrating details of a system for dynamic user interface generation using large language models, according to some embodiments.

FIG. 2 is a block diagram illustrating details of a system 200 for dynamic user interface generation using large language models, according to some embodiments. Specifically, the example of FIG. 2 illustrates an exemplary client device 110-1 (of the client devices 110) and an exemplary server 130-1 (of the servers 130) in the network architecture 100 of FIG. 1.

Client device 110-1 and server 130-1 are communicatively coupled over network 150 via respective communications modules 202-1 and 202-2 (hereinafter, collectively referred to as "communications modules 202"). Communications modules 202 are configured to interface with network 150 to send and receive information, such as requests, data, messages, commands, and the like, to other devices on the network 150. Communications modules 202 can be, for example, modems or Ethernet cards, and/or may include radio hardware and software for wireless communications (e.g., via electromagnetic radiation, such as radiofrequency (RF), near field communications (NFC), Wi-Fi, and Bluetooth radio technology).

The client device 110-1 and server 130-1 also include a processor 205-1, 205-2 and memory 220-1, 220-2, respectively. Processors 205-1 and 205-2, and memories 220-1 and 220-2 will be collectively referred to, hereinafter, as "processors 205," and "memories 220." Processors 205 may be configured to execute instructions stored in memories 220, to cause client device 110-1 and/or server 130-1 to perform methods and operations consistent with embodiments of the present disclosure.

The client device 110-1 and the server 130-1 are each coupled to at least one input device 230-1 and input device 230-2, respectively (hereinafter, collectively referred to as "input devices 230"). The input devices 230 can include a mouse, a controller, a keyboard, a pointer, a stylus, a touchscreen, a microphone, voice recognition software, a joystick, a virtual joystick, a touch-screen display, and the like. In some embodiments, the input devices 230 may include cameras, microphones, sensors, and the like. In some embodiments, the sensors may include touch sensors, acoustic sensors, inertial motion units and the like.

The client device 110-1 and the server 130-1 are also coupled to at least one output device 232-1 and output device 232-2, respectively (hereinafter, collectively referred to as "output devices 232"). The output devices 232 may include a screen, a display (e.g., the same touchscreen display used as an input device), a speaker, an alarm, and the like. A user may interact with client device 110-1 and/or server 130-1 via the input devices 230 and the output devices 232.

Memory 220-1 may further include an application 222, configured to execute on client device 110-1 and couple with input device 230-1 and output device 232-1, and implementing dynamic user interface generation using large language models. The application 222 may be downloaded by the user from server 130-1, and/or may be hosted by server 130-1. The application 222 may include specific instructions which, when executed by processor 205-1, cause operations to be performed consistent with embodiments of the present disclosure. In some embodiments, the application 222 runs on an operating system (OS) installed in client device 110-1. In some embodiments, application 222 may run within a web browser. In some embodiments, the processor 205-1 is configured to control a graphical user interface (GUI) (e.g., spanning at least a portion of input devices 230 and output devices 232) for the user of client device 110-1 to access the server 130-1.

In some embodiments, memory 220-2 includes an application engine 232. The application engine 232 may be configured to perform methods and operations consistent with embodiments of the present disclosure. The application engine 232 may share or provide features and resources with the client device 110-1, including data, libraries, and/or applications retrieved with application engine 232 (e.g., application 222). The user may access the application engine 232 through the application 222. The application 222 may be installed in client device 110-1 by the application engine 232 and/or may execute scripts, routines, programs, applications, and the like provided by the application engine 232.

Memory 220-1 may further include an application 223, configured to execute in client device 110-1. The application 223 may communicate with service 233 in memory 220-2 to provide dynamic user interface generation using large language models. The application 223 may communicate with service 233 through API layer 240, for example.

Figure 3:
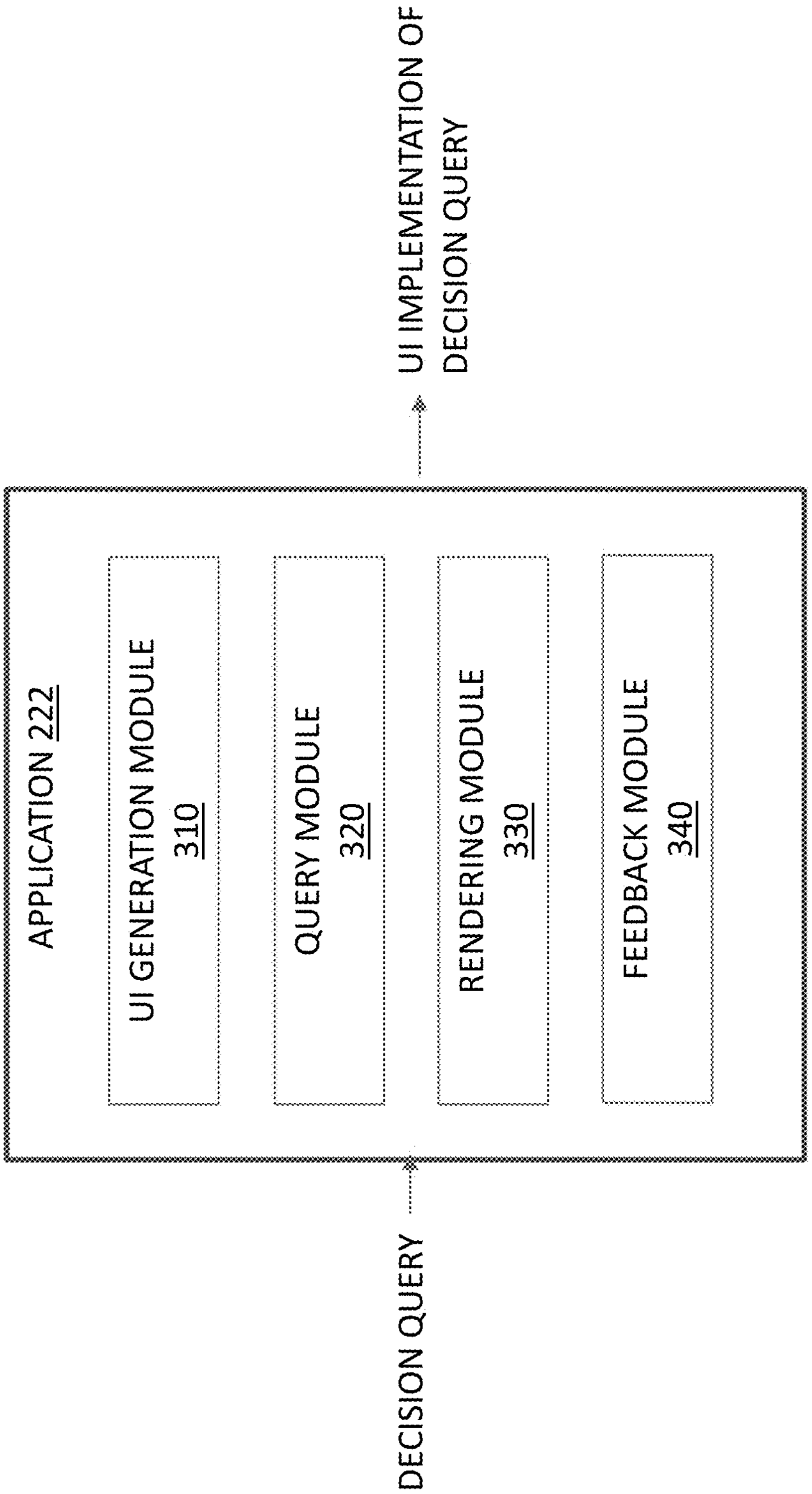
FIG. 3 depicts a block diagram of an example configuration for dynamic user interface generation using large language models, in accordance with an illustrative embodiment.

FIG. 3 depicts a block diagram of an example configuration for dynamic user interface generation using large language models, in accordance with an illustrative embodiment. Application 222 is the same as application 222 in FIG. 2.

UI generation module 310 trains a first LLM to generate source code implementing an input set of UI components. In some implementations of module 310, the training includes fine-tuning a foundational source code generation LLM using a dataset of user interface component data as training data. One non-limiting example of a foundational source code generation LLM is CodeLlama; other LLMs that generate source code, both open source and not, are also available. Some non-limiting examples of datasets of user interface component data usable as training data during the fine-tuning are developer documentation from open-source UI component libraries such as Chakra UI or Bootstrap. These datasets of user interface component data include a documentation page for every UI component in a library. Each page explains what the component is called, what the component is used for, and includes code-snippets for rendering or using the component. To fine-tune a foundational source code generation LLM using a dataset of user interface component data as training data, one implementation of module 310 uses Parameter-Efficient Fine-Tuning (PEFT) with Low-Rank Adaptation (LoRA), both presently available techniques. Other fine-tuning techniques are also possible. Once an LLM is trained to generate source code implementing an input set of UI components, for example by fine-tuning, the LLM is capable of responding to a prompt such as "I am a user that needs to submit my shipping info including my name, address, and email address to the system as part of a checkout flow. Write code that enables me to do so using UI components," with source code that implements an arrangement of UI components, such as a shipping information form the user can fill out to provide shipping information.

Query module 320 receives a first decision query from a user. A decision query is a request for a UI to help the user explore data relevant to making a decision. One non-limiting example of a decision query is "help me decide which electric car to buy."

Query module 320 generates a first UI generation task from the first decision query. The first UI generation task includes a decision criterion and a dataset of data relevant to the decision criterion. To generate the first UI generation task, module 320 generates a prompt corresponding to the first decision query and supplies the generated prompt to a second LLM. In one implementation of module 320, the second LLM is a foundational language generation LLM trained to produce text. Foundational language generation LLMs trained to produce text are presently available. For example, if the decision query is "help me decide which electric car to buy," module 320 might generate a prompt such as "You are an assistant that helps users reason about a decision problem. Decide what criteria is most common for the decision and what data should be considered. Here is an input example: What electric car should I buy? Here is an output example: [Table of criteria to consider] [Table of data to select from]." Some non-limiting examples of decision criteria corresponding to the electric car decision, that might be output by the foundational language generation LLM trained to produce text, are range, horsepower, price, tax incentives, and charging infrastructure. Some non-limiting examples of data to select from corresponding to the electric car decision, that might be output by the foundational language generation LLM trained to produce text, are top ten best-selling electric vehicle makes and models and the most important attributes for each, such as range, horsepower, price, number of seats, 0-60 time, and number of doors. Note that training text for some foundational language generation LLMs includes some decision-related knowledge up to a particular training date. One implementation of module 320 supplements the LLM's knowledge with additional or updated data, for example obtained from a dataset or by searching a communications network such as the internet.

Module 320 uses the trained UI generation model to generate, from the first UI generation task, first source code implementing a first arrangement of UI components. In particular, module 320 generates a prompt corresponding to the first UI generation task and supplies the generated prompt to the trained UI generation model. The prompt includes the first UI generation task and, optionally, descriptions of previously generated UI components. In response to the prompt, the trained UI generation model generates source code implementing the first UI generation task. If the trained UI generation model does not find one or more appropriate UI components in the descriptions of previously generated UI components, module 320 generates source code for UI components to be displayed in one or more logical groups as a form. Note that if the overall cached UI component dataset becomes too large for the trained UI generation model's context window (i.e., the size of the mode's prompt), one implementation of module 320 uses Retrieval Augmented Generation (RAG), a presently available technique, to search and match the right blocks for use rather than including the entire dataset in the prompt. Other prompt supplementation techniques are also possible.

Rendering module 330 uses a webpage rendering framework, a presently available technique, to execute the generated source code, rendering the first arrangement of UI components onto a webpage or other UI implementation accessible to a user for use in exploring data relevant to the user's decision query.

Feedback module 340 solicits and obtains feedback from a user regarding the first arrangement of UI components. Application 222 uses the trained UI generation model and the feedback corresponding to the first arrangement of UI components to generate, from the first UI generation task, second source code implementing a second arrangement of UI components. Application 222 uses the webpage rendering framework to execute the generated source code, rendering the second arrangement of UI components onto a webpage or other UI implementation accessible to a user for use in exploring data relevant to the user's decision query. Another implementation of application 222 uses the feedback to further train the trained UI generation model, for example using a presently available reinforcement fine-tuning technique.

Application 222 stores, in a UI component dataset, source code implementing a generated UI component in an arrangement of UI components. In implementations of application 222, the UI component dataset includes a description of the generated UI component as well as the source code implementing the generated UI component. From a second decision query (from the same or a different user), application 222 generates a second UI generation task including a second decision criterion and a second dataset. Application 222 generates, from the second UI generation task, using the trained UI generation model, source code implementing a third arrangement of UI components. The source code includes stored source code from the UI component dataset.

Figure 4:
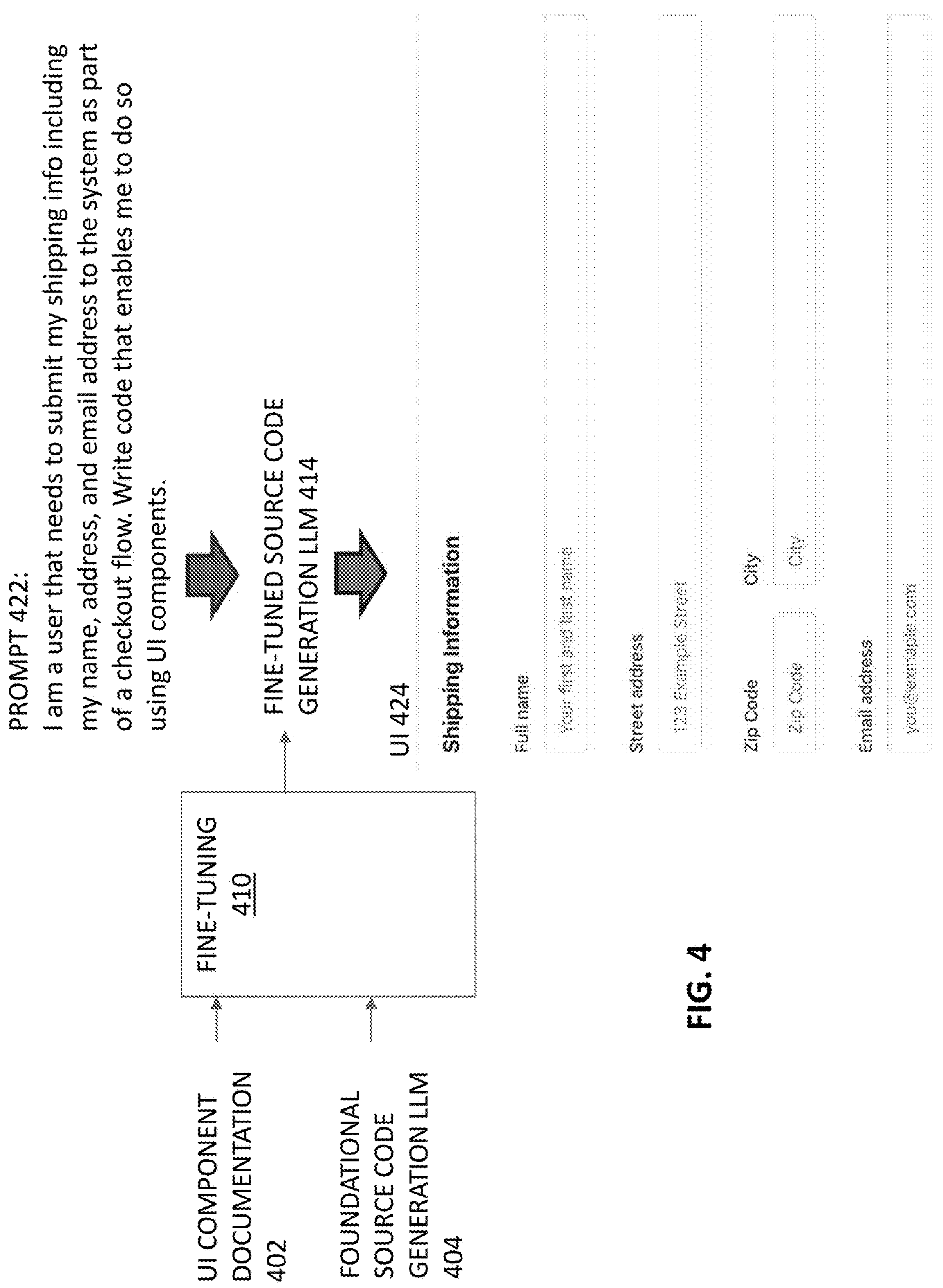
FIG. 4 depicts an example of dynamic user interface generation using large language models, in accordance with an illustrative embodiment.

FIG. 4 depicts an example of dynamic user interface generation using large language models, in accordance with an illustrative embodiment. The example can be executed using application 222 in FIG. 2.

In the depicted example, fine-tuning 410 uses UI component documentation 402 as training data to fine-tune foundational source code generation LLM 404, generating fine-tuned source code generation LLM 414. Once trained to generate source code implementing an input set of UI components, LLM 414 is capable of responding to prompt 422 with UI 424.

Figure 5:
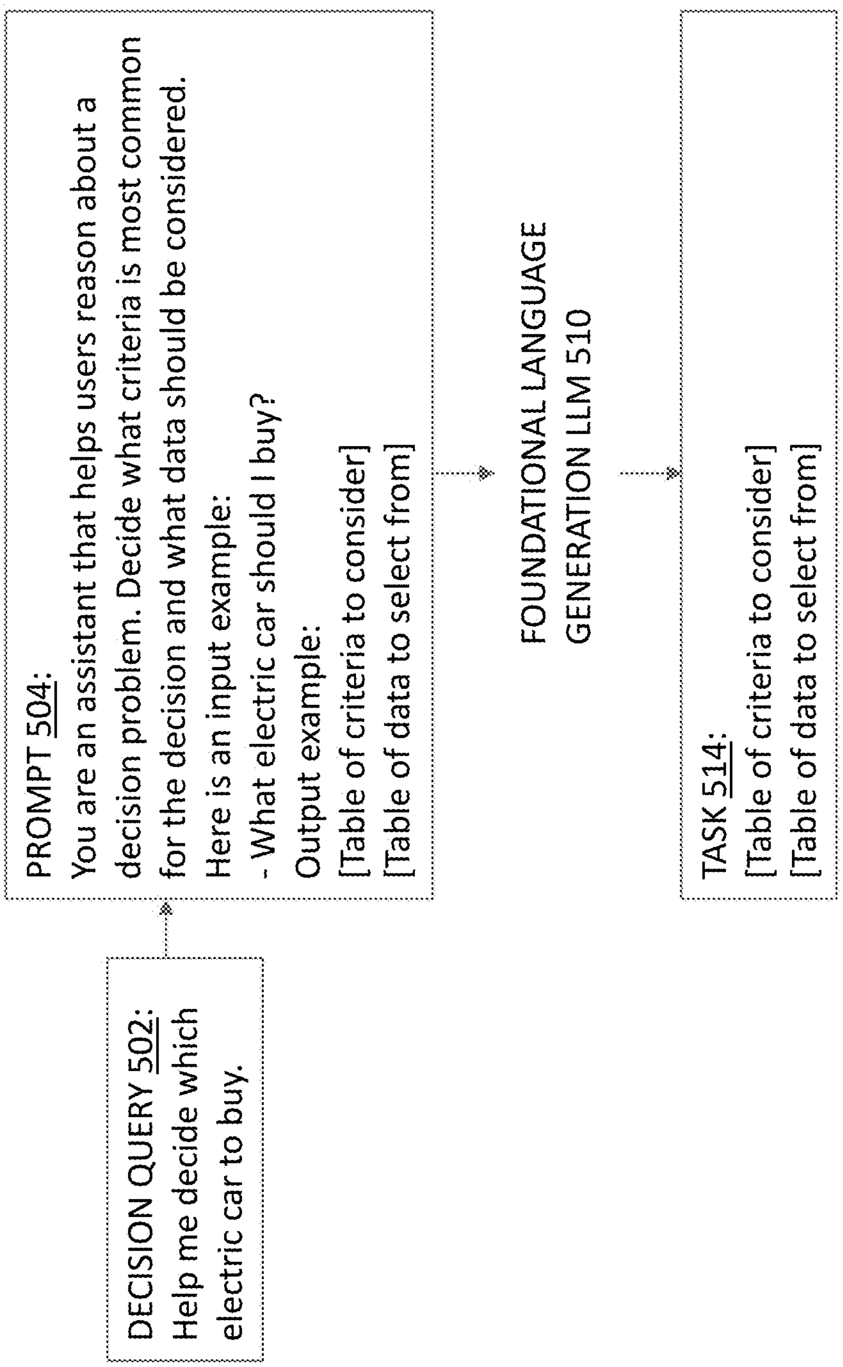
FIG. 5 depicts another example of dynamic user interface generation using large language models, in accordance with an illustrative embodiment.

FIG. 5 depicts another example of dynamic user interface generation using large language models, in accordance with an illustrative embodiment. The example can be executed using application 222 in FIG. 2.

As depicted, application 222 receives decision query 502 from a user, and generates prompt 504 corresponding to decision query 502. Application 222 supplies prompt 504 to foundational language generation LLM 510. LLM 510 is trained to produce text. In response to prompt 504, LLM 510 generates task 514, a UI generation task including a decision criterion and a dataset of data relevant to the decision criterion.

Figure 6:
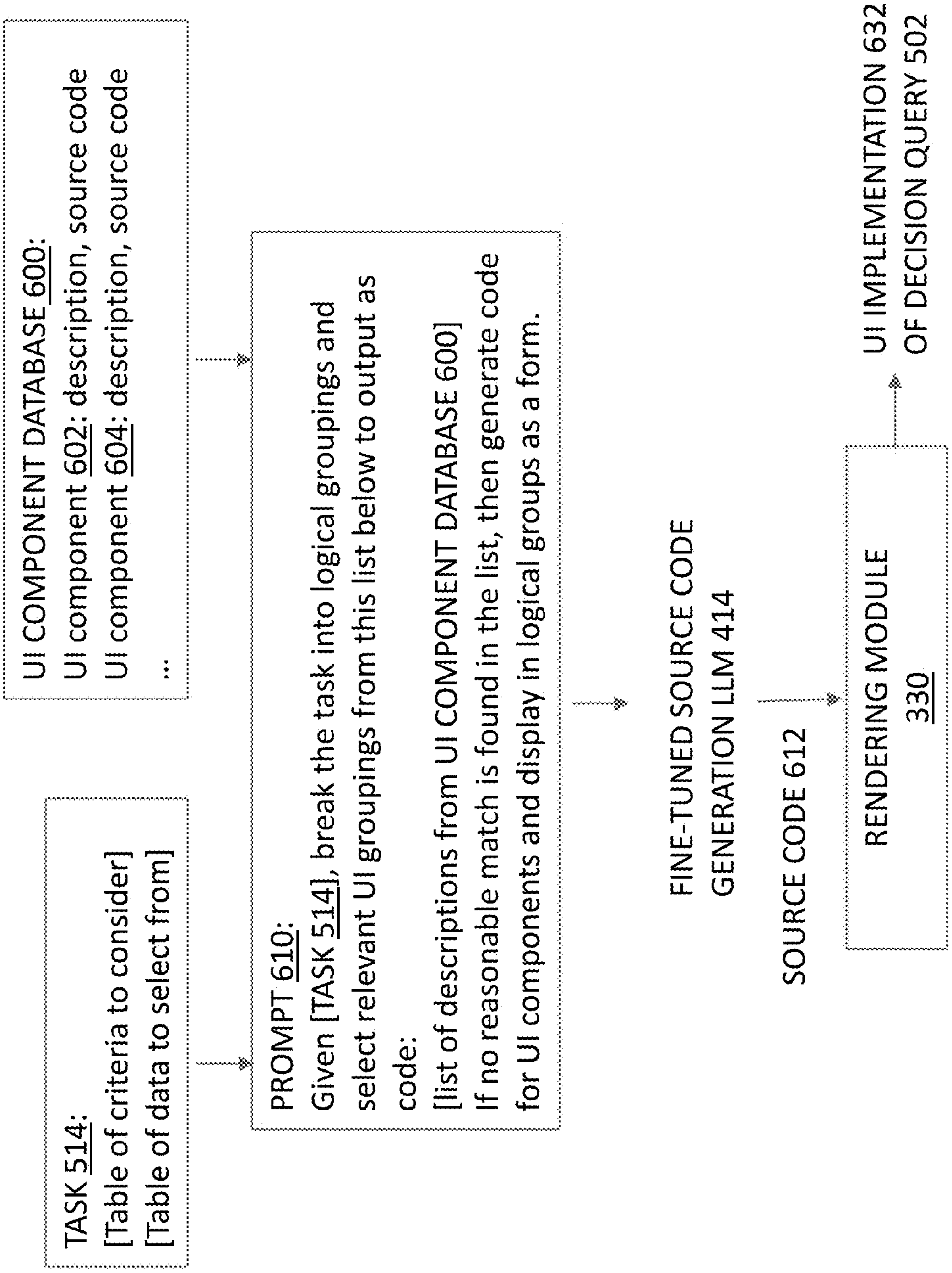
FIG. 6 depicts a continued example of dynamic user interface generation using large language models, in accordance with an illustrative embodiment.

FIG. 6 depicts a continued example of dynamic user interface generation using large language models, in accordance with an illustrative embodiment. Rendering module 330 is the same as rendering module 330 in FIG. 3. Fine-tuned source code generation LLM 414 is the same as fine-tuned source code generation LLM 414 in FIG. 4. Decision query 502 and task 514 are the same as decision query 502 and task 514 in FIG. 5.

As depicted, application 222 generates prompt 610, using task 514 and UI component database 600 (including UI components 602 and 604). Application 222 supplies prompt 610 to fine-tuned source code generation LLM 414, generating source code 612 implementing task 514. Rendering module 330 uses a webpage rendering framework to execute source code 612, rendering UI implementation 632 of decision query 502.

Figure 7:
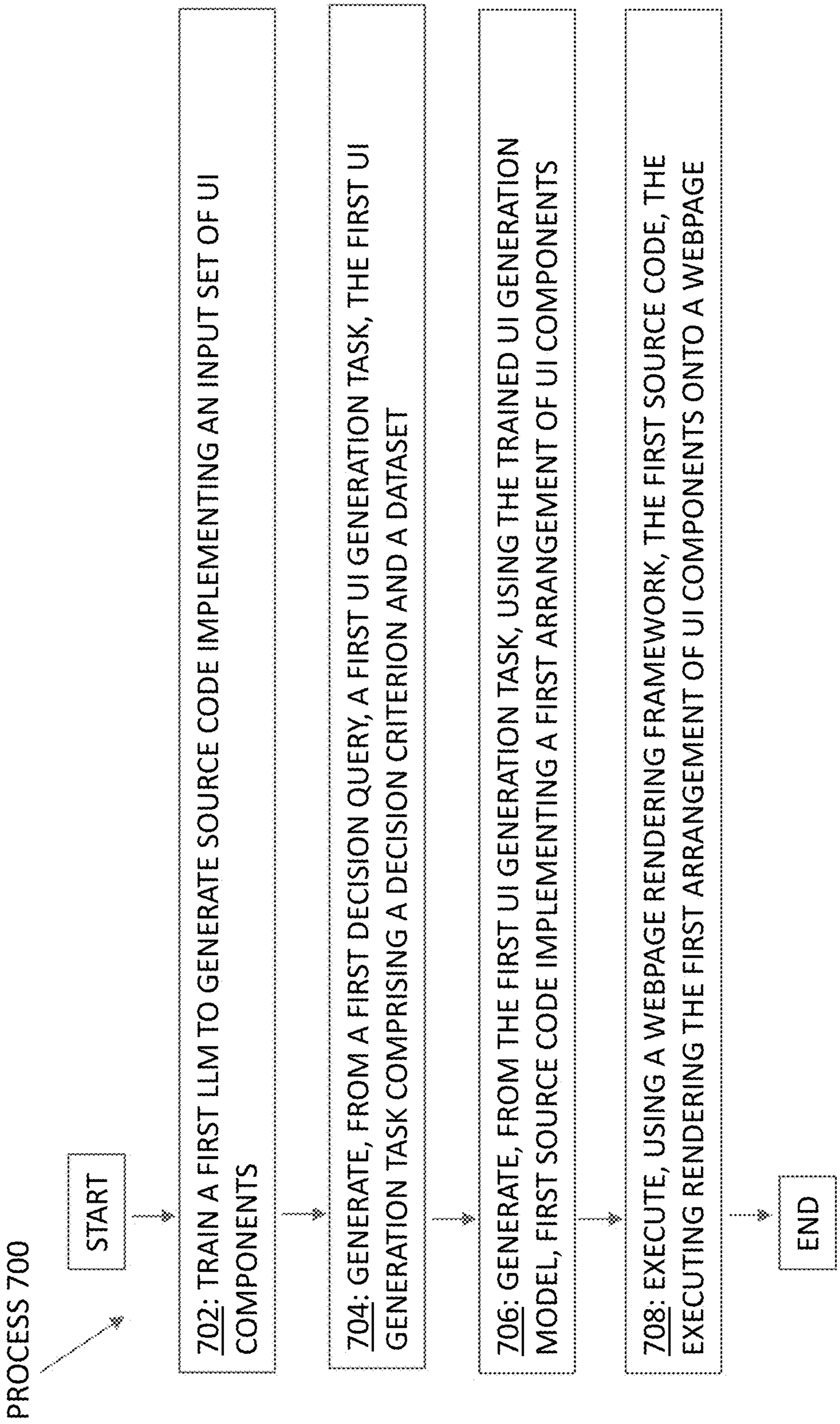
FIG. 7 depicts a flowchart of an example process for dynamic user interface generation using large language models in accordance with an illustrative embodiment.

FIG. 7 depicts a flowchart of an example process for dynamic user interface generation using large language models, in accordance with an illustrative embodiment. Process 700 can be implemented in application 222 in FIG. 2.

At block 702, the process trains a first LLM to generate source code implementing an input set of UI components. At block 704, the process generates, from a first decision query, a first UI generation task, the first UI generation task comprising a decision criterion and a dataset. At block 706, the process generates, from the first UI generation task, using the trained UI generation model, first source code implementing a first arrangement of UI components. At block 708, the process executes, using a webpage rendering framework, the first source code, the executing rendering the first arrangement of UI components onto a webpage. Then the process ends.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In one or more embodiments, the computer-readable media is non-transitory computer-readable media, computer-readable storage media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

To the extent that the terms "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. In one aspect, various alternative configurations and operations described herein may be considered to be at least equivalent.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. It is understood that some or all steps, operations, or processes may be performed automatically, without the intervention of a user.

Method claims may be provided to present elements of the various steps, operations, or processes in a sample order, and are not meant to be limited to the specific order or hierarchy presented.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

The Title, Background, and Brief Description of the Drawings of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the included subject matter requires more features than are expressly recited in any claim. Rather, as the claims reflect, inventive subject matter lies in less than all features of a single disclosed configuration or operation. The claims are hereby incorporated into the Detailed Description, with each claim standing on its own to represent separately patentable subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

Embodiments consistent with the present disclosure may be combined with any combination of features or aspects of embodiments described herein.

The invention claimed is:

1. A computer-implemented method comprising:

training a first large language model (LLM) to generate source code implementing an input set of user interface (UI) components, the training resulting in a trained UI generation model;

generating, from a first decision query, a first UI generation task, the first UI generation task comprising a decision criterion and a dataset;

generating, from the first UI generation task, using the trained UI generation model, first source code implementing a first arrangement of UI components; and executing, using a webpage rendering framework, the first source code, the executing rendering the first arrangement of UI components onto a webpage.

2. The computer-implemented method of claim 1, wherein the training comprises fine-tuning, using a dataset of user interface component data, a foundational source code generation LLM.

3. The computer-implemented method of claim 1, wherein the first UI generation task is generated by prompting a second LLM with the first decision query.

4. The computer-implemented method of claim 3, wherein the second LLM is a foundational language generation LLM.

5. The computer-implemented method of claim 1, further comprising:

generating, from the first UI generation task, using the trained UI generation model and feedback corresponding to the first arrangement of UI components, second source code implementing a second arrangement of UI components; and executing, using the webpage rendering framework, the second source code, the executing rendering the second arrangement of UI components onto the webpage.

6. The computer-implemented method of claim 1, further comprising:

further training, using feedback corresponding to the first arrangement of UI components, the trained UI generation model.

7. The computer-implemented method of claim 1, further comprising:

storing, in a UI component dataset, stored source code implementing a UI component in the first arrangement of UI components.

8. The computer-implemented method of claim 7, further comprising:

generating, from a second decision query, a second UI generation task, the second UI generation task comprising a second decision criterion and a second dataset; and generating, from the second UI generation task, using the trained UI generation model, source code implementing a third arrangement of UI components, the source code comprising the stored source code.

9. A non-transitory computer-readable medium storing a program, which when executed by a computer, configures the computer to:

train a first large language model (LLM) to generate source code implementing an input set of user interface (UI) components, the training resulting in a trained UI generation model;

generate, from a first decision query, a first UI generation task, the first UI generation task comprising a decision criterion and a dataset;

generate, from the first UI generation task, using the trained UI generation model, first source code implementing a first arrangement of UI components; and execute, using a webpage rendering framework, the first source code, the executing rendering the first arrangement of UI components onto a webpage.

10. The non-transitory computer-readable medium of claim 9, wherein the training comprises fine-tuning, using a dataset of user interface component data, a foundational source code generation LLM.

11. The non-transitory computer-readable medium of claim 9, wherein the first UI generation task is generated by prompting a second LLM with the first decision query.

12. The non-transitory computer-readable medium of claim 11, wherein the second LLM is a foundational language generation LLM.

13. The non-transitory computer-readable medium of claim 9, wherein the program, when executed by the computer, further configures the computer to:

generate, from the first UI generation task, using the trained UI generation model and feedback corresponding to the first arrangement of UI components, second source code implementing a second arrangement of UI components; and execute, using the webpage rendering framework, the second source code, the executing rendering the second arrangement of UI components onto the webpage.

14. The non-transitory computer-readable medium of claim 9, wherein the program, when executed by the computer, further configures the computer to:

further train, using feedback corresponding to the first arrangement of UI components, the trained UI generation model.

15. The non-transitory computer-readable medium of claim 9, wherein the program, when executed by the computer, further configures the computer to:

store, in a UI component dataset, stored source code implementing a UI component in the first arrangement of UI components.

16. The non-transitory computer-readable medium of claim 15, wherein the program, when executed by the computer, further configures the computer to:

generate, from a second decision query, a second UI generation task, the second UI generation task comprising a second decision criterion and a second dataset; and generate, from the second UI generation task, using the trained UI generation model, source code implementing a third arrangement of UI components, the source code comprising the stored source code.

17. A system comprising:

a processor; and a non-transitory computer readable medium storing a set of instructions, which when executed by the processor, configure the system to:

train a first large language model (LLM) to generate source code implementing an input set of user interface (UI) components, the training resulting in a trained UI generation model;

generate, from a first decision query, a first UI generation task, the first UI generation task comprising a decision criterion and a dataset;

generate, from the first UI generation task, using the trained UI generation model, first source code implementing a first arrangement of UI components; and execute, using a webpage rendering framework, the first source code, the executing rendering the first arrangement of UI components onto a webpage.

18. The system of claim 17, wherein the training comprises fine-tuning, using a dataset of user interface component data, a foundational source code generation LLM.

19. The system of claim 17, wherein the first UI generation task is generated by prompting a second LLM with the first decision query.

20. The system of claim 19, wherein the second LLM is a foundational language generation LLM.

* * * * *